United States Patent
Allen

(10) Patent No.: US 11,143,307 B2
(45) Date of Patent: Oct. 12, 2021

(54) SEAL ASSEMBLY

(71) Applicant: Aktiebolaget SKF, Gothenburg (SE)

(72) Inventor: Warrick Allen, Hilversum (NL)

(73) Assignee: Aktiebolaget SKF, Gothenburg (SE)

(*) Notice: Subject to any disclaimer, the term of this patent is extended or adjusted under 35 U.S.C. 154(b) by 188 days.

(21) Appl. No.: 16/511,041

(22) Filed: Jul. 15, 2019

(65) Prior Publication Data
US 2020/0032910 A1 Jan. 30, 2020

(30) Foreign Application Priority Data
Jul. 26, 2018 (DE) .......................... 102018212501.5

(51) Int. Cl.
*F16J 15/3284* (2016.01)
*F16J 15/3232* (2016.01)

(52) U.S. Cl.
CPC ....... *F16J 15/3284* (2013.01); *F16J 15/3232* (2013.01)

(58) Field of Classification Search
CPC .. F16J 15/3284; F16J 15/3268; F16J 15/3232; F16J 15/32; F16J 15/3207
USPC ....................................................... 277/565
See application file for complete search history.

(56) References Cited

U.S. PATENT DOCUMENTS

| | | | |
|---|---|---|---|
| 3,671,048 A | 6/1972 | Gyory et al. | |
| 6,457,870 B2 | 10/2002 | Aizawa et al. | |
| 9,121,505 B2 * | 9/2015 | Kurth | F16J 15/453 |
| 2007/0246895 A1 * | 10/2007 | Pavan | F16J 15/44 |
| | | | 277/549 |
| 2008/0311337 A1 * | 12/2008 | Veinot | H01L 21/02263 |
| | | | 428/90 |
| 2012/0001395 A1 | 1/2012 | Kurth et al. | |
| 2017/0292608 A1 | 10/2017 | Barbera et al. | |

FOREIGN PATENT DOCUMENTS

WO 2011141299 A1 11/2011

OTHER PUBLICATIONS

Uptake of water droplets by nonwetting capillaries, Geoff K. Willmott, Chiara Neto and Shaun G. Hendy, The MacDiarmid Institute for Advanced Materials and Nanotechnology, Industrial Research Limited, 69 Gracefield Rd, PO Box 31-310, Lotuer Hutt 5040, New Zealand School of Chemistry, The University of Sydney, NSW2006, Australia School of Chemical and Physical Sciences, Victoria University of Wellington, Wellington 6140, New Zealand, corresponding author, Email: g.willmott@irl.cri.nz, Phone: (64) (0)4 931 3220, Fax: (64) (0)4 931.

* cited by examiner

*Primary Examiner* — Nathan Gumar
(74) *Attorney, Agent, or Firm* — Garcia-Zamor Intellectual Property Law; Ruy Garcia-Zamor; Bryan Peckjian

(57) ABSTRACT

A dual function coating on a counterface of a seal. The dual function provides having a low friction and being hydrophobic. This is achieved by chemically modifying a low friction coating. Gaps are included, primarily on the exterior side of a seal, one side being coated with the modified low friction coating on a counterface and the other side with a hydrophobic or omniphobic material on a seal body. The material can be in the form of a coating, film, strip, or ring depending on application, and be coated, glued, fused, mechanically attached or by any other suitable method, attached to the seal body. The gap should preferably be in the order of 0.2 to 1 mm wide, thus creating 'reverse-capillary' function where water cannot pass all the way through the gap.

9 Claims, 2 Drawing Sheets

SEAL ASSEMBLY

CROSS-REFERENCE TO RELATED APPLICATIONS

This application claims priority to Italian patent application no. 102018212501.5 filed on Jul. 26, 2018, the contents of which are fully incorporated herein by reference.

FIELD OF THE INVENTION

The invention concerns seal assemblies and is more particularly directed to frictional seal assemblies protecting machine parts such as rolling element bearings from water and other external contaminants.

BACKGROUND OF THE INVENTION

A seal assembly seals a first portion of a machine part relative to a second portion of the machine part. A seal assembly normally includes at least one seal element that contact the machine part or contacts a component connected with the machine part. Seal assemblies of this type are well known, they are known as frictional seals, such as radial shaft seals.

A seal should prevent moisture and contaminants from entering an internal part of a machine part, and if there is lubrication internally, involving for example a bearing, then the seal should also prevent oil or grease from leaking out of the internal machine part. It cannot always be prevented that moisture and dirt enter into the area to be sealed. A corrosion danger and/or a contamination of a lubricant (oil or grease) can be the results due an ingress of water, which in turn can lead to operational disruptions and/or even operational breakdowns. Traditionally improving protection against ingress of water/moisture has been by implementing a greater number of seal elements and/or seal lips.

There has been some recent developments to improve the properties of seals by the addition of hydrophobic coatings, this is disclosed in for example US2012/0001395 and WO2011/141299. However there is still room for improvements in the field of frictional seals.

BRIEF SUMMARY OF THE INVENTION

An object of the invention is to define a seal assembly with increased protection against water and moisture ingress and at the same time reducing friction in frictional seals.

The aforementioned objects are achieved according to the invention by a seal assembly comprising a seal body having at least one seal lip and a counterface. The at least one seal lip, when in use, is in contact with the counterface covering a contact area on the counterface. According to the invention the counterface is coated with a chemically modified low friction coating, the chemical modification makes the coating hydrophobic. The coating of the counterface, when in use, also extend on both sides of the contact area, thereby creating a hydrophobic barrier close to the at least one seal lip.

Preferably the low friction coating is a polyurethane low friction coating. The low friction coating is preferably also chemically modified with a low surface tension silicone modified polyacrylate monomer units with mono-hydroxyl functionality to allow the additive to bond into the polyurethane to thereby create the hydrophobic chemically modified low friction coating.

In some embodiments the seal body extends in part towards the counterface that is coated, to thereby create a gap between the extended part of the seal body and a part of the coated counterface. It is then preferable that the part of the seal body that creates a gap with the counterface, comprises a hydrophobic or omniphobic material. Suitably the hydrophobic or omniphobic material is in the form of a coating, film, strip, or ring, depending on application. It is then coated, glued, fused, mechanically attached or by any other suitable method, attached to the part of the seal body that creates a gap with the counterface.

In some embodiments the counterface is a flinger. The part of the counterface that the seal body extend towards can then be a coated edge of the flinger or a coated leg of the flinger.

In other embodiments the counterface is a slot dimensioned such that during use a part of the seal body and the at least one seal lip fit into the slot creating a gap on both sides of the seal body. A depth of the gap extends for the part of the seal body that is within the slot creating a slit on both sides of the seal for the length of the seal. The seal body comprises at least on one side of the seal body at least on the part of the seal body that creates a gap with the counterface, a hydrophobic or omniphobic material.

Suitably the gap is between 0.05 mm and 5 mm wide, more suitably between 0.1 mm and 3 mm and is preferably in the order of 0.2 mm to 1 mm wide.

The different additional enhancements of the seal assemblies according to the invention can be combined in any desired manner as long as no conflicting features are combined.

A primary purpose of the invention is to provide a means to be able to increase protection against water/moisture ingress and provide a low friction surface for the seal lip. This is obtained according to the invention by chemically modifying a polyurethane low friction coating with a low surface tension silicone modified polyacrylate monomer units with mono-hydroxyl functionality to allow the additive to bond into the polyurethane, and then at least coating a surface larger than, and on both sides of, the contact surface of the seal lip on the counterface. Other advantages of this invention will become apparent from the detailed description.

BRIEF DESCRIPTION OF THE SEVERAL VIEWS OF THE DRAWING

The invention will now be described in more detail for explanatory, and in no sense limiting, purposes, with reference to the following figures, in which.

DETAILED DESCRIPTION OF THE INVENTION

In order to clarify the method and device according to the invention, some examples of its use will now be described in connection with FIGS. 1 to 5.

The seal assemblies according to the invention might be utilized in radial applications, as for example a radial seal of for example a bearing, a shaft or a bearing housing or another type of housing. These comprise an inner and outer member that are coaxial and that are relatively rotatable. The seal assemblies according to the invention can also be utilized in linear applications.

Figure 1:
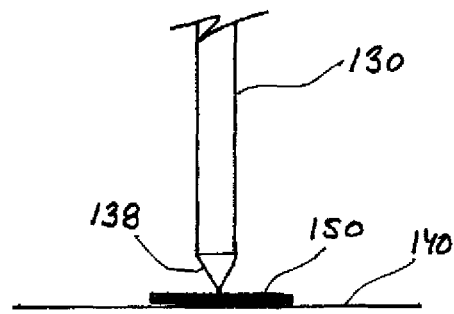
FIG. 1 illustrates a detail of a seal assembly according to a first embodiment of the invention.

FIG. 1 illustrates a detail of a seal assembly according to a first embodiment of the invention comprising a seal body 130 with a seal lip 138 that in use presses onto a modified low friction coating 150 on a counterface 140.

The modified low friction coating 150 is a polyurethane low friction coating that is chemically modified. The low friction polymer coating hardly shows any hydrophobic effect. For this reason the polymer is chemically modified with a low surface tension silicone modified polyacrylate monomer units with mono-hydroxyl functionality to allow the additive to bond into the polyurethane. During cure the very low surface tension of the silicone modified acrylate monomer causes its migration to the air-liquid interface at the surface, thereby, chemically modifying the surface after cure. The advantage of pursuing the same coating used to impart low friction is that it combines both effects with the same treatment stage and reduces process costs.

The poly(isocyanate) hardener solution (5.25 g) is thoroughly mixed with a nanosilica suspension (5.2 g, 20 nm primary particle size) in a volumetric cylinder. A solution of a hydroxy modified silicone-polyacrylate monomer (1.0 ml) is added and mixed thoroughly. The reactive polyol suspension component (12.2 g), is added and also mixed thoroughly for ten minutes without high shear equipment to avoid damage to the suspension.

The formulation is then for example deposited by dip coating onto a desired surface and left for 18 hours to dry and cure in ambient conditions. This is followed by heat treatment at 120° C. for 3 hours. The dry film thickness is estimated to be in the order of ~20 microns. The contact angle with deionised water is estimated to be in the order of ~100-110°, as this is >90° it qualifies as a hydrophobic surface.

An alternative hydrophobic low friction coating is a polyurethane acrylate with a polysiloxane dispersion additive. Polyisocyanate (5 g) is added to an acrylic polyol dispersion (10.6 g) with low shear mixing maintained for 5 minutes. A hydroxy modified polydimethylsiloxane dispersion (1.3 g) is then added dropwise to the other components over several minutes. To this mixture 1 ml deionized water is then also added dropwise over one minute with stirring maintained. The mixture is then left to stand for 20 minutes to remove bubbles.

The formulation is then applied as a thin layer on an NBR elastomer substrate at approximately 60 microns thickness and left to dry gradually at room temperature over 24 hours, followed by treatment at 110° C. for 3 hours in a fan assisted oven. In this way a thin, translucent, hydrophobic low friction coating is produced.

The coating should be wider than the contact width of the seal lip 138 creating a surface that is not only low friction but also a hydrophobic surface. This will dramatically diminish chances of water transporting from one side of the seal lip 138 to the other side. The most important is that the transport of water from an outside to an inside is stopped or at least made more difficult. It is in this embodiment advantageous if the counterface rotates, it will then fling water away from the coated surface, as water will not wet to the coated surface.

Figure 2:
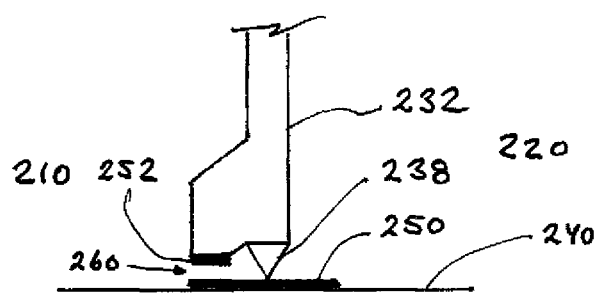
FIG. 2 illustrates a detail of a seal assembly according to a second embodiment of the invention.

FIG. 2 illustrates a detail of a seal assembly according to a second embodiment of the invention comprising a seal body 232 with a seal lip 238 that in use presses onto a modified low friction coating 250 on a counterface 240. The second embodiment is a further development of the first embodiment. The illustrated seal is asymmetrical and it is therefore defined what is a preferable external side 210 of the seal assembly, where there can be water and other contamination that it is desirable to keep away from the internal side 220 of the seal assembly, where, in bearing applications, there will most likely be oil or grease for lubrication of one or more bearings.

The seal body 232 further comprises an extension towards the external side 210 in such a way that in use a gap 260 is created between the seal body 232 and an area of the counterface 240 that is coated 250. At least a surface on the seal body that defines the gap 260 together with the coated 250 counterface 240, comprises a hydrophobic or omniphobic material 252. The hydrophobic or omniphobic material 252 can be in the form of a coating, film, strip, or ring, depending on application, and be coated, glued, fused, mechanically attached or by any other suitable method, attached to the seal body 232. The hydrophobic or omniphobic material 252 can be the same material as the modified low friction coating 250 and described above, but can also be a dedicated hydrophobic or omniphobic material 252.

In use, the gap 260 between the hydrophobic or omniphobic material and the modified low friction coating can be between 0.05 mm and 5 mm, more suitably between 0.1 mm and 3 mm and is preferably in the order of 0.2 mm to 1 mm wide. The gap is preferably at least a few millimeters deep from the external side 210 towards the internal side 220 thereby creating a slit. The slit will run along the whole length of the seal, if it is a radial seal the slit will form a circle/ring. With these gap dimensions this slit will create a 'reverse-capillary' function where water cannot pass all the way through the gap.

In other embodiments, the seal can be made symmetrical with extensions and gaps on both sides of the seal.

Figure 3:
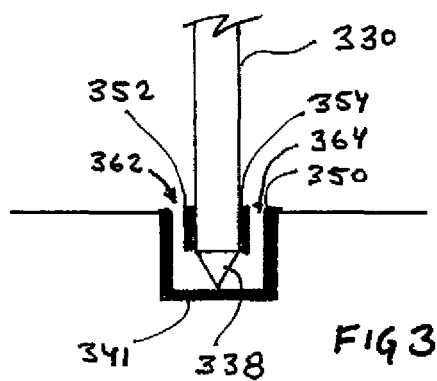
FIG. 3 illustrates a detail of a seal assembly according to a third embodiment of the invention, FIG. 4 illustrate details of a seal assembly according to a fourth embodiment of the invention, FIG. 5 illustrate a detail of a seal assembly according to a fifth embodiment of the invention.

FIG. 3 illustrates a detail of a seal assembly according to a third embodiment of the invention comprising a seal body 330 with a seal lip 238 that in use presses onto a modified low friction coating 350 on a counterface 341. In this embodiment the counterface is symmetrically configured as a slot as illustrated. In alternative embodiments the counterface can be asymmetrically configured as a step. The slot and the seal body 330 with the seal lip 338 are dimensioned so that also a part of the seal body 330 enters the slot by at least in the order of a few millimeters. The seal body 330 has a first hydrophobic or omniphobic material 352 as a coating, film, strip, or ring, at least in the order of a few millimeters where when in use the seal body 330 is in the slot, and the seal body 330 has a second optional hydrophobic or omniphobic material 354 as a coating, film, strip, or ring, at least in the order of a few millimeters where when in use the seal body 330 is in the slot. The second material 354 is only there if the counterface 341 is a slot, not if it is a step, if it is on an internal side, it can alternatively suitably be oleophobic or omniphobic. If the seal body 330 only has material 352 on one side, then this is preferably the external side, to thereby hinder water ingress at the source side. The seal body 330 and the slot are also dimensioned so that when in use the seal body 330 with material 352, 354 and the coated 350 counterface 341 create gaps 362, 364 between each other on either side can be between 0.05 mm and 5 mm, more suitably between 0.1 mm and 3 mm and is preferably in the order of 0.2 mm to 1 mm wide, as this will create a 'reverse-capillary' function where water cannot pass all the way through the gaps 362, 364.

Figure 4:
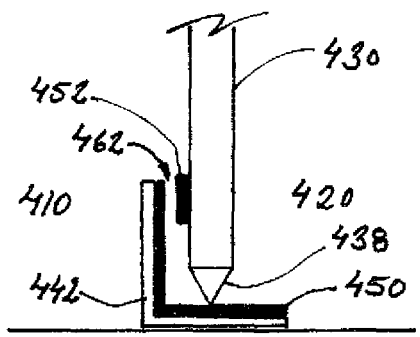

FIG. 4 illustrates details of a seal assembly according to a fourth embodiment of the invention where a flinger is used as a counterface 442. The fourth embodiment of the invention comprises a seal body 430 with a seal lip 438 that in use presses onto a modified low friction coating 450 on the counterface 442. The illustrated seal is asymmetrical and it is therefore defined what is a preferable external side 410 of the seal assembly, where there can be water and other contamination that it is desirable to keep away from the internal side 420 of the seal assembly, where, in bearing applications, there will most likely be oil or grease for lubrication of one or more bearings.

The coated 450 counterface 442 is L shaped, with the seal lip 438 when in use is being pressed onto the lower leg, and the seal body 330 overlaps the upper leg by at least in the order of a few mm. The seal body 330 comprises a hydrophobic or omniphobic material 452 as a coating, film, strip, or ring, for at least a part of the overlap when in use between the seal body 330 and the upper leg of the coated 450 counterface 442. When in use the seal body 330 and counterface 442 are arranged such that a gap 462 is created between the hydrophobic or omniphobic material 452 and the modified low friction coating 450. The gap can be between 0.05 mm and 5 mm, more suitably between 0.1 mm and 3 mm and is preferably in the order of 0.2 mm to 1 mm wide, thus creating a slit with a 'reverse-capillary' function where water cannot pass all the way through the gap 462.

Figure 5:
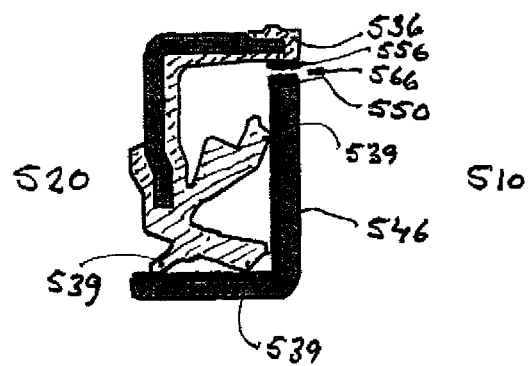

FIG. 5 illustrate a detail of a seal assembly according to a fifth embodiment of the invention. The fifth embodiment illustrates a radial seal, where the invention is implemented on/across the thickness/the edge of a flinger 546 acting as a counterface 546. The fifth embodiment of the invention comprises a seal body 536 attached to a casing sleeve, with one or more seal lips 539 that in use presses onto a modified low friction coating 550 on the counterface 546. This seal is also asymmetrical and it is therefore defined what is a preferable external side 510 of the seal assembly, where there can be water and other contamination that it is desirable to keep away from the internal side 520 of the seal assembly, where, in bearing applications, there will most likely be oil or grease for lubrication of one or more bearings.

In this type of seal, the invention is utilizing an edge of the counterface 546, where it is proximate to the seal body 536, making it possible to create a gap 566 between a hydrophobic or omniphobic material applied to the seal body 536 and the modified low friction coating 550 applied also to the edge of the counterface 546. The gap can be between 0.05 mm and 5 mm, more suitably between 0.1 mm and 3 mm and is preferably in the order of 0.2 mm to 1 mm wide, thus creating a slit with a 'reverse-capillary' function where water cannot pass all the way through the gap 462. The slit, with coatings on both sides, will only be as deep as the counterface is thick.

The invention is based on the basic inventive idea of having a dual function coating on a counterface. The dual function is having low friction and being hydrophobic. This is achieved by chemically modifying a low friction coating. A further development is to create gaps, primarily on the exterior side of a seal, one side being coated with the modified low friction coating on a counterface and the other side with a hydrophobic or omniphobic material on a seal body. The material can be in the form of a coating, film, strip, or ring depending on application, and be coated, glued, fused, mechanically attached or by any other suitable method, attached to the seal body. The gap can be in the order of 0.05 mm to 5 mm wide and is suitably in the order of 0.2 mm to 1 mm wide, thus creating 'reverse-capillary' function where water cannot pass all the way through the gap. The invention is not restricted to the above-described embodiments but may be varied within the scope of the following claims.

FIG. 1 illustrates a detail of a seal assembly according to a first embodiment of the invention:
130 Seal body,
138 Seal lip,
140 Counterface,
150 Modified low friction coating.

FIG. 2 illustrates a detail of a seal assembly according to a second embodiment of the invention:
210 External side of seal assembly,
220 Internal side of seal assembly,
232 Seal body with an extension to thereby create a gap,
238 Seal lip,
240 Counterface,
250 Modified low friction coating,
252 Hydrophobic or omniphobic material as a coating, film, strip, or ring,
260 Gap between the hydrophobic or omniphobic material and the modified low friction coating.

FIG. 3 illustrates a detail of a seal assembly according to a third embodiment of the invention:
330 Seal body,
338 Seal lip,
341 Counterface in a slot as illustrated or a step,
350 Modified low friction coating,
352 A first hydrophobic or omniphobic material as a coating, film, strip, or ring,
354 A second optional hydrophobic or omniphobic material as a coating, film, strip, or ring, this second one only if the counterface is a slot, not if it is a step, if it is on the internal side, it can alternatively suitably be oleophobic or omniphobic,
362 A first gap between the first hydrophobic or omniphobic material and the modified low friction coating,
364 A second gap between the second hydrophobic/oleophobic or omniphobic material and the modified low friction coating.

FIG. 4 illustrates details of a seal assembly according to a fourth embodiment of the invention:
410 External side of seal assembly,
420 Internal side of seal assembly,
430 Seal body,
438 Seal lip,
442 Counterface,
450 Modified low friction coating,
452 A hydrophobic or omniphobic material as a coating, film, strip, or ring,
462 A gap between the hydrophobic or omniphobic material and the modified low friction coating, FIG. 5 illustrate a detail of a seal assembly according to a fifth embodiment of the invention:
510 External side of seal assembly,
520 Internal side of seal assembly
536 Seal body,
539 One or more seal lips,
546 Counterface,
550 Modified low friction coating
556 A hydrophobic or omniphobic material as a coating, film, strip, or ring,
566 A gap between the oleophobic or omniphobic material and the modified low friction coating.

What is claimed is:

1. A seal assembly comprising:
a seal body having at least one seal lip;
a counterface; wherein
the at least one seal lip is in contact with the counterface covering a contact area on the counterface, and wherein
the counterface is coated with a chemically modified low friction coating, the chemical modification making the coating hydrophobic, wherein the low friction coating is a polyurethane low friction coating and is chemically modified with a low surface tension silicone modified polyacrylate monomer units with mono-hydroxyl functionality to allow the additive to bond into the polyurethane to thereby create the hydrophobic chemically modified low friction coating, and in that the coating of the counterface, when in use, extend on both sides of the at least one seal lip which is in contact with the counterface, thereby creating a hydrophobic barrier close to the at least one seal lip.

2. The seal assembly according to claim 1, wherein the seal body extends in part towards the counterface that is coated, to thereby create a gap between the extended part of the seal body and a part of the coated counterface.

3. The seal assembly according to claim 2, wherein the part of the seal body that creates a gap with the counterface, comprises a hydrophobic or omniphobic material.

4. The seal assembly according to claim 3, wherein the hydrophobic or omniphobic material is in the form of a coating, film, strip, or ring, depending on application, and is coated, glued, fused, mechanically attached or by any other suitable method, attached to the part of the seal body that creates a gap with the counterface.

5. The seal assembly according to claim 2, wherein the counterface is a flinger.

6. The seal assembly according to claim 5, wherein the part of the counterface that the seal body extend towards is a coated edge of the flinger.

7. The seal assembly according to claim 5, wherein the part of the counterface that the seal body extend towards is a coated leg of the flinger.

8. The seal assembly according anyone of claim 2, wherein the gap is between 0.05 mm and 5 mm wide.

9. The seal assembly according to claim 1, wherein the counterface is a slot configured such that a part of the seal body and the at least one seal lip fit into the slot and create a gap on both sides of the seal body, a depth of the gap extending for the part of the seal body that is within the slot creating a slit on both sides of the seal for the length of the seal, the seal body comprising at least on one side of the seal body at least on the part of the seal body that creates a gap with the counterface, comprises a hydrophobic or omniphobic material.

* * * * *